United States Patent [19]
Schlarb et al.

[11] Patent Number: 5,595,696
[45] Date of Patent: Jan. 21, 1997

[54] PLASTIC MATERIAL, AND PROCESS FOR THE PREPARATION THEREOF

[75] Inventors: Alois Schlarb, Frankenthal; Jürgen Hofmann, Ludwigshafen; Hilmar Ohlig, Kaiserslautern; Peter Ittemann, Lampertheim; Karl-Peter Farwerck, Worms, all of Germany

[73] Assignee: BASF Aktiengesellschaft, Ludwigshafen, Germany

[21] Appl. No.: 457,380

[22] Filed: Jun. 1, 1995

[30] Foreign Application Priority Data

Jun. 3, 1994 [DE] Germany .......................... 44 19 579.6

[51] Int. Cl.⁶ .................................................. B29B 9/14
[52] U.S. Cl. ............... 264/118; 264/136; 264/211.21; 264/141; 264/143; 264/328.18; 264/DIG. 53; 425/112; 428/372; 428/378
[58] Field of Search .................................. 264/141, 143, 264/328.18, 349, DIG. 53, 118, 135, 136, 211.21; 428/372, 378; 425/112

[56] References Cited

U.S. PATENT DOCUMENTS

| | | | |
|---|---|---|---|
| 3,304,282 | 2/1967 | Cadus et al. | 264/349 |
| 3,409,711 | 11/1968 | Pashak et al. | 264/143 |
| 3,453,356 | 7/1969 | Kent, Jr. et al. | 264/143 |
| 3,577,494 | 5/1971 | Chisholm et al. | 264/143 |
| 3,931,094 | 1/1976 | Segal et al. | 264/328.18 |
| 4,549,920 | 10/1985 | Cogswell et al. | 156/181 |
| 4,708,623 | 11/1987 | Aoki et al. | 264/328.18 |
| 4,980,232 | 12/1990 | Prevorsek et al. | 428/401 |
| 5,041,258 | 8/1991 | Ilyama et al. | 264/328.18 |
| 5,358,680 | 10/1994 | Boissonnat et al. | 264/328.18 |
| 5,424,020 | 6/1995 | Hara et al. | 264/257 |
| 5,447,793 | 9/1995 | Montsinger | 425/112 |

FOREIGN PATENT DOCUMENTS

| | | | |
|---|---|---|---|
| 086715 | 8/1983 | European Pat. Off. | |
| 1454789 | 4/1969 | Germany | 264/143 |
| 51-50358 | 5/1976 | Japan | 264/143 |
| 56-5718 | 1/1981 | Japan | 264/143 |
| 1-241406 | 9/1989 | Japan | 264/328.18 |
| 2-67112 | 3/1990 | Japan | 264/328.18 |

OTHER PUBLICATIONS

Database WPI, Derwent Publications Ltd., AN 81–95963d (English abstract of JP–A 56 147 845, Nov. 18, 1981).

Primary Examiner—Jeffery R. Thurlow
Attorney, Agent, or Firm—Keil & Weinkauf

[57] ABSTRACT

In a fiber composite plastic composed of plastic composition and fibers, the fibers have a pronounced fiber length distribution, in particular more than 50% by weight of the fibers have a length outside the range from 0.8×L to 1.2×L, where L is the mean (weight average) fiber length, and the mean fiber length is greater than the critical fiber length of the plastic composition/fiber system.

32 Claims, 3 Drawing Sheets

FIG. 1
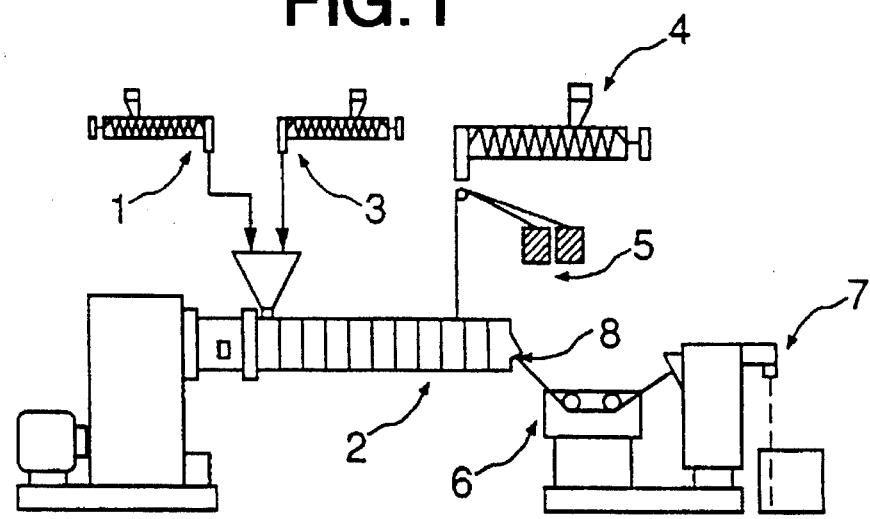
FIG. 1A
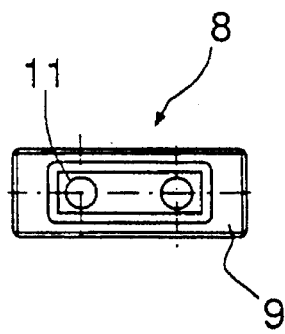
FIG. 1D
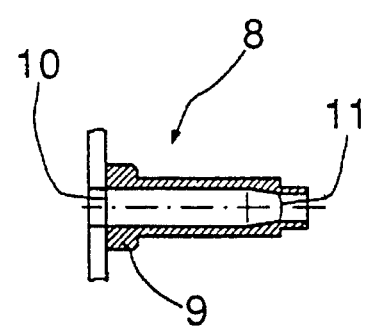
FIG. 1B
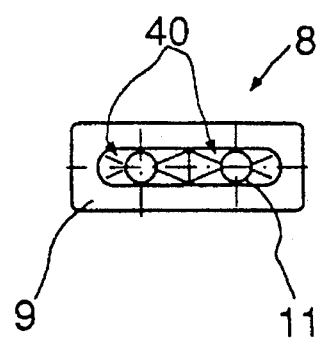
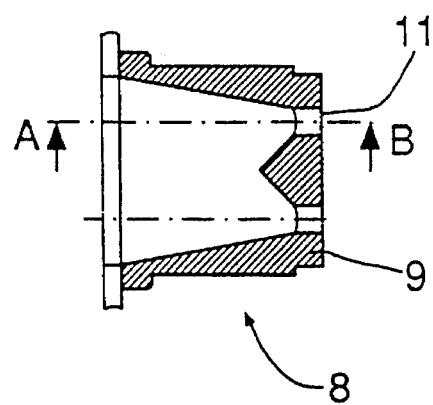
FIG. 1C

PLASTIC MATERIAL, AND PROCESS FOR THE PREPARATION THEREOF

The present invention relates to a fiber composite plastic and to a process for the preparation thereof and in particular to a composite material comprising continuous fibers and a plastic matrix.

Fiber-reinforced pellets (granules), in particular reinforced with chopped glass fibers, are produced in extruders by incorporation of fibers, generally having a length of 4.5 mm, into the melt (hot feed). The fibers are metered in via a feed screw. On mixing the plastic phase, both comminution and distribution processes then take place. The aim is a homogeneous extrudate having a very narrow fiber length distribution and a mean fiber length of 200–500 μm. After mixing, the composition is extruded through a breaker plate. The resulting extrudates solidify or crystallize, for example in a waterbath, and are then comminuted in the granulation unit to give pellets having a length of 2–5 min. These pellets are employed for the production of moldings by injection molding.

The use of this technique for the production of pellets containing continuous reinforcing fibers has hitherto failed essentially for two reasons:
1. The screw design used for compounding in twin-screw extruders causes a shortening of the fibers below a length of 1 mm.
2. Fibers having a length of >500 μm project radially out of the extrudate after the die and prevent problem-free granulation and further processing, for example in injection-molding machines.

Continuous fiber pellets are today produced by four different methods:
1. In-situ polymerization
2. Powder impregnation
3. Melt sheathing
4. Melt impregnation The first two methods circumvent the problems of wetting the fibers with a high-viscosity melt by applying the matrix material directly to the fiber filaments in a preliminary step or as a fine powder.

In the case of melt sheathing, a fiber roving is drawn through a pressurized, melt-filled chamber and thus sheathed. The inner fiber filaments are not wetted during this operation, so that complete wetting must take place in a further processing step, for example in injection molding. Bradt described a sheathing process in U.S. Pat. No. 3,042,570 (1962). This is predominantly employed today in the cable industry for the production of electrical cables.

Continuous-fiber-reinforced thermoplastic pellets can be produced using the pultrusion method, which was disclosed by Howald and Meyer in U.S. Pat. No. 2,571,717 (1951) and has been refined by Cogswell and Hezzel in U.S. Pat. No. 4,549,920. Today, it is employed in industry for the production of pellets reinforced by means of continuous glass fibers. In the pultrusion process, continuous fibers, together with the plastic surrounding them, can be drawn through apertures to form pultrudates, which are then chopped to form continuous-fiber pellets with a length of about 10 mm for injection molding or up to 50 mm for plasticization/compression molding. The characteristic feature of the pellets produced in this way is a uniform fiber length corresponding to the pellet length, and the fact that the fibers are aligned parallel to the longitudinal axis of the pellets.

However, a uniform fiber length can cause problems during further processing by injection molding or in compression molding since fibers close to the wall are fixed as early as during the flow process through solidification of the plastic matrix, and form domains of different fiber content and thus form components having highly anisotropic properties and in particular worse spatial fiber distribution.

It is an object of the present invention to provide a plastic material comprising a plastic matrix and relatively long fibers which does not have said disadvantages of known plastic pellets reinforced by continuous fibers. It is a further object of the present invention to provide a process for the preparation of such plastic materials which is both inexpensive to carry out and versatile. In particular, adjustment of process parameters and geometrical mensurations should allow the properties and geometrical mensurations of the resultant plastic material to be adjusted.

We have found that this object is achieved by the plastic materials defined in the claims, where the subclaims describe preferred embodiments. The invention also provides a process for the preparation of plastic materials, as defined in the claims directed thereto, preferred variants of the process being defined in the corresponding subclaims.

The invention is based on the idea of producing continuous-fiber pellets having a broad fiber distribution using an inexpensive, industrially proven impregnation technology, ie. by means of extrusion compounding. The plastic materials are suitable both for the production of finished parts by compression molding and for injection molding.

The preferred plastic material or continuous-fiber pellets comprise(s) from 65 to 92 parts by volume of plastic, in particular thermoplastic, and 35 to 8 parts by volume of fibers. The fibers do not have uniform lengths, but rather have a broad fiber length distribution. Fiber lengths are preferably from 0.1 mm to the pellet length. The fibers are not arranged strictly parallel in the pellet, but in particular are distributed randomly and are not all arranged in a straight line.

In this preferred process for the production of continuous-fiber pellets, plastic, in particular thermoplastic, and fibers having a length of greater than 3 mm are fed to an extruder, where they are mixed, extruded through a die and then chopped or first segmented and then chopped in a unit.

The preferred continuous-fiber pellets according to the invention comprise from 65 to 92 parts by volume of plastic, in particular thermoplastic, and from 35 to 8 parts by volume of fibers, preferably from 75 to 87 parts by volume of plastic, in particular thermoplastic, and from 25 to 13 parts by volume of fibers. Suitable thermoplastics are polyolefins, styrene polymers, polyamides, saturated polyesters, polycarbonates, polyetherimides, polyether ketones and polyether sulfones. Preference is given to a propylene homopolymer having an MFI of from 5 to 500 g/10 min (according to DIN 53735) and propylene graft copolymers, for example with acrylic acid. Suitable fibers are glass fibers, carbon fibers, sisal fibers, flax fibers, coconut fibers and similar natural fibers. The pellets may contain conventional additives, such as stabilizers, fillers, dyes, flameproofing agents and adhesion promoters.

The pellets are produced either from continuous fiber rovings or from chopped fibers, which have a length of, for example, 13.5 mm. These fibers can either be fed to an extruder together with thermoplastic pellet or powder (cold feed) or introduced into the thermoplastic melt (hot feed) via a feed screw or an aperture.

Both in the cold feed method and downstream in the hot feed method, further additives, for example stabilizers, nucleating agents, dyes and fillers, can be added.

The thermoplastic is plasticized in the extruder and mixed intimately with the remaining components. This is achieved using single- or multi-screw extruders with only weak peak shear fields downstream of the fiber addition, preferably corotating twin-screw extruders. After the extrusion and chopping of the extrudate, the fibers in the pellets have a pronounced length distribution, the mean fiber length being greater than the critical fiber length of the fiber/plastic matrix combination employed.

In the novel process for the preparation of the plastic material or continuous-fiber pellets, the plastic composition is thus first mixed with the fibers of uniform length, and the fiber length distribution is significantly broadened by the compounding process. Adjustment of the process parameters and the geometrical conditions (screw design) allows the fiber length distribution to be adjusted within broad limits.

The measurement parameters mentioned herein can be determined as follows:

mean fiber length [mm]:
$$L_M = \Sigma K_i H_i$$

where
$L_M$=mean fiber length [mm]
$K_i$=mean value of fiber length class i
$H_i$=frequency in fiber length class i Fiber Length Distribution The fiber length distribution determination is divided into 3 steps:

1. Ashing
2. Fractionation
3. Preparation and image evaluation

Re. 1: The pellets are heated at 700° C. for 10 minutes in a muffle furnace, during which the polymer matrix completely decomposes, leaving a fiber residue.

Re. 2: Fractionation:

Owing to the large fiber length range, the fiber residue cannot be measured in one fraction. The residue is therefore divided into different fractions with the aid of a metallic sieve plate. The plate is a flat, electrically earthed brass plate with 1 mm holes at an average spacing from their neighbors of 4 mm; a central zone and a 20 mm border contain no holes. The fiber residue from the sample is carefully placed in the central hole-free zone using wooden rods so that the fibers are oriented parallel to the surface. In this state, they are carefully pushed parallel to the surface over the holes to the border zone.

The sieve process gives three fractions:

Fraction I: small fibers (90%<1 mm) fall through the holes into a glass collector.

Fraction II: fibers of medium length (mainly around 2-3 mm) form a layer on the plate which is knocked into a collector after removal of fraction III.

Fraction III: relatively long fibers (mostly >4 mm) form a light residue on being moved to and fro which collects in the border zone, where it is transferred into a vessel using tweezers.

Re. 3: Preparation and image evaluation

Each of the three fractions is introduced into paraffin oil, distributed therein by manual shaking, applied to a specimen slide or glass dish and if necessary loosened using a wooden rod.

The images of fraction I are produced by transmitted light microscopy and evaluated by means of a computer with appropriate software to give a length distribution of fraction I. The images of fractions II and III are observed in transmitted light by a macroobjective and evaluated by means of a computer with appropriate software to give the length distribution of the fractions.

The distributions of the fractions are subsequently converted into a fiber length distribution of the sample.

Two examples of an evaluation for determination of the fiber length distribution are shown in FIGS. 4 and 5.

Critical Fiber Length

In formal terms, the critical fiber length is calculated from $$I_c = \frac{\sigma_f \cdot d_f}{\tau_m \cdot 2}$$

where
$I_c$=critical fiber length
$\sigma_f$=fiber breaking strength
$d_f$=fiber diameter
$\tau_m$=matrix shear strength (optimum adhesion)

For the polypropylene/E-glass system:

|  |  | Mean value | Lower limit | Upper limit |
|---|---|---|---|---|
| $\sigma_f$ | MPa | 2400 | 2400 | 2400 |
| $d_f$ | μm | 14 | 10 | 24 |
| $\tau_m$ | MPa | 14 | 20 | 5 |
| $I_c$ | mm | 1.2 | 0.6 | 5.76 |

Further details are given in G. W. Ehrenstein "Polymerwerkstoffe", Carl Hanser Verlag Munich, 1978/1979, Chapter 6.3.3.2, pp. 164–172.

The matrix shear strength is determined by the process described in Polymer Composites, Aug. 1988, Vol. 9, No. 4, pp. 245–251.

Fiber Volume

Fiber weight divided by the density of the fiber material.

The pellets can either be processed further in an injection molding machine, giving moldings having a fibrous skeletal structure (and thus better stress transfer), or by plastication in a plastication unit, for example a screw machine or a circulating-air oven, and re-pressed to give a finished part.

BRIEF DESCRIPTION OF DRAWINGS

The invention is described in greater detail with reference to the drawings, in which FIG. 1 shows a diagrammatic view of an apparatus for carrying out the novel process;

FIGS. 1a–d show the die arrangement employed in the apparatus of FIG. 1;

Figure 2:
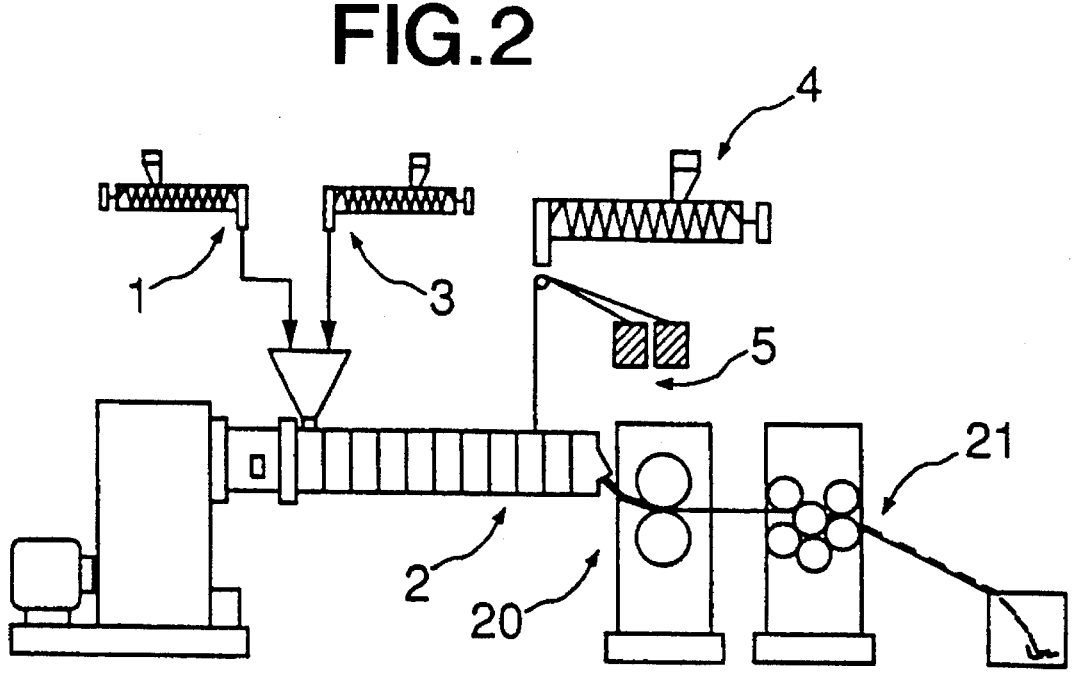
FIG. 2 shows a diagrammatic view of a further apparatus for carrying out the novel process.

In the apparatus shown in FIG. 1, polymer is fed to the extruder 2 from the conveyor 1. Additives are fed to the extruder 2 via a corresponding conveyor 3, and chopped glass fibers or continuous glass fiber rovings are fed to the extruder via conveyor 4 or feed device 5 respectively. A material is extruded in the apparatus with the aid of the special dies as shown in FIG. 1a-d and fed through a waterbath 6 to a pelletizer 7, where pellets are formed which have the particular fiber lengths and fiber length distributions, but nevertheless have a smooth surface, essentially without protruding fiber ends.

The dies 8 are in the form of twin die elements 8. The die body 9 contains two die orifices 40 with a smooth, step-free surface between the inlet aperture 10 and the extrusion aperture 11. FIG. 1a shows a front view and FIG. 1b a back view (ie. in the flow direction) of the twin die. FIG. 1c shows a cross-sectional view of the twin die 8 with both extrusion apertures 11, and FIG. 1d shows a cross-sectional view along the line A-B through the die shown in FIG. 1c. The angle of inclination of the internal surfaces of the die with respect to the axis of the extrusion aperture or extrusion direction is preferably in the range from 0° to 45°, particularly preferably from 0° to 15°.

The following details apply in general to this embodiment of the invention:

In the case of viscous molding compositions having a pronounced internal structural viscosity, as in molding compositions having a high glass fiber content, regions of considerable flow changes, for example at projections and recesses, see flow separation and thus uncontrolled sliding along the wall, with tearing of the surface and emergence of the glass fibers from the surface. The memory effect of the polymers means that this surface change also continues into dies, and may even be reinforced therein.

This effect can be countered in accordance with the invention by designing the extruder (die strip) in such a way that virtually no flow breaks occur. This is achieved by selecting the angle of feed to the die orifices at from 0 to 45 degrees, preferably from 0 to 15 degrees. At short separations, as between the die orifices, an angle of up to 45 degrees can be selected. At higher flow rates through the die orifices (>20 kg/h), a more acute angle (<45 degrees) should also be selected at this point.

It should be ensured here that not only the die strip, but the entire die head is designed accordingly, or at least the ratio between the feed zone with the angles to the die orifices indicated in accordance with the invention and the die diameter exceeds a value of 3:1.

FIG. 2 shows a further apparatus for the production of the novel pellets. In this apparatus, the pelletization takes place with the aid of a segmenting unit 20 and a chopping unit 21. The segmenting unit has a device for embossing the pellets. Smooth pellet surfaces essentially without projecting fiber ends are achieved here by mechanical pressing against shape-providing surfaces during molding.

Figure 3:
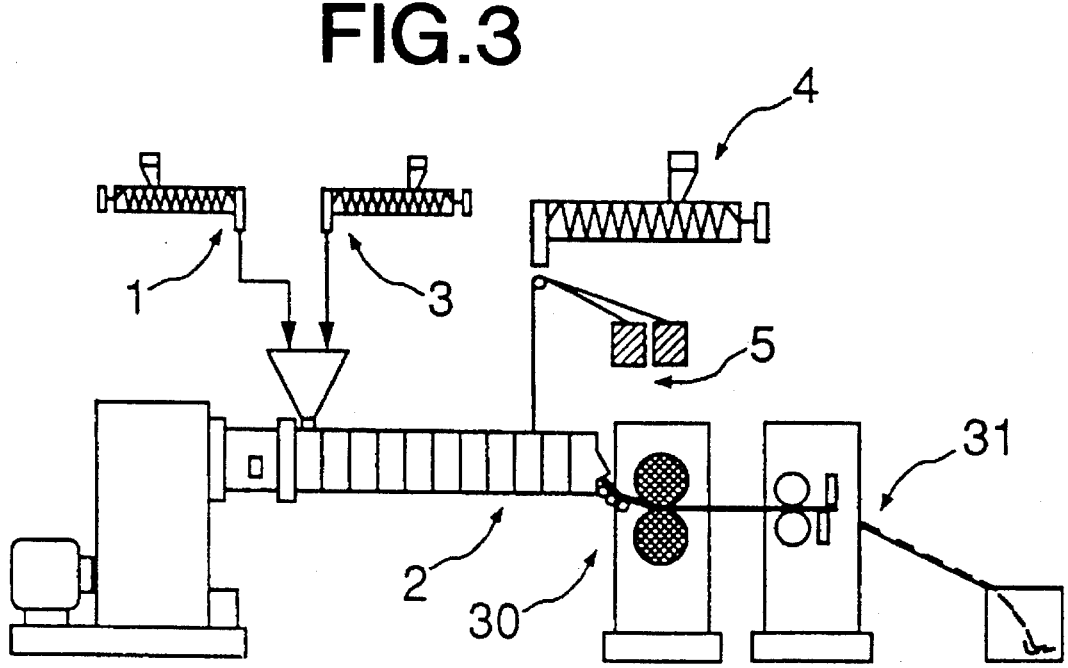
FIG. 3 shows a diagrammatic view of a third apparatus for carrying out the novel process.
Figure 4:
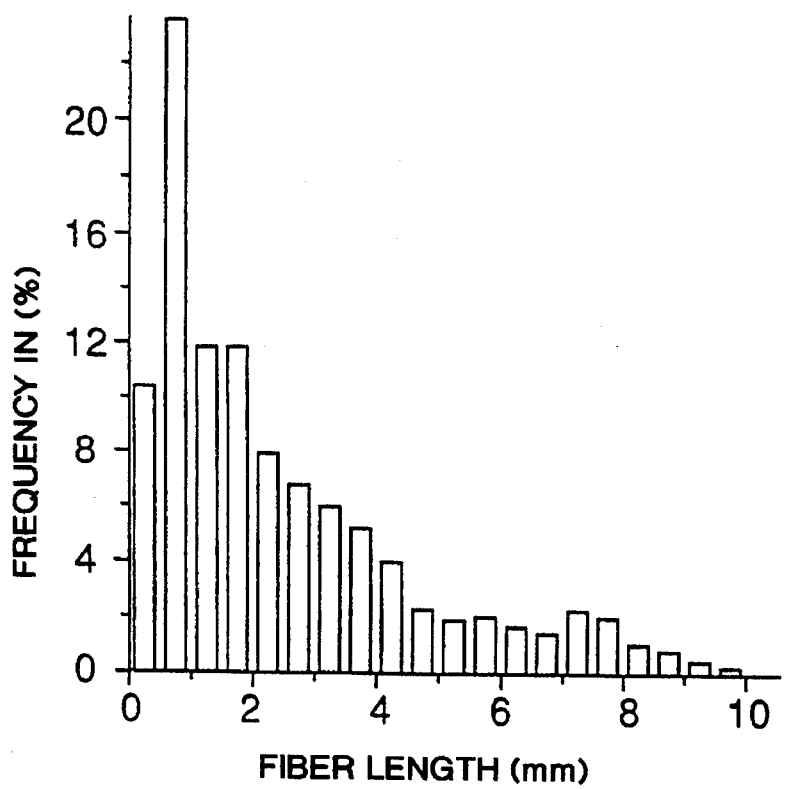
FIG. 4 shows a graph of a frequency distribution of fiber lengths in a novel material.
Figure 5:
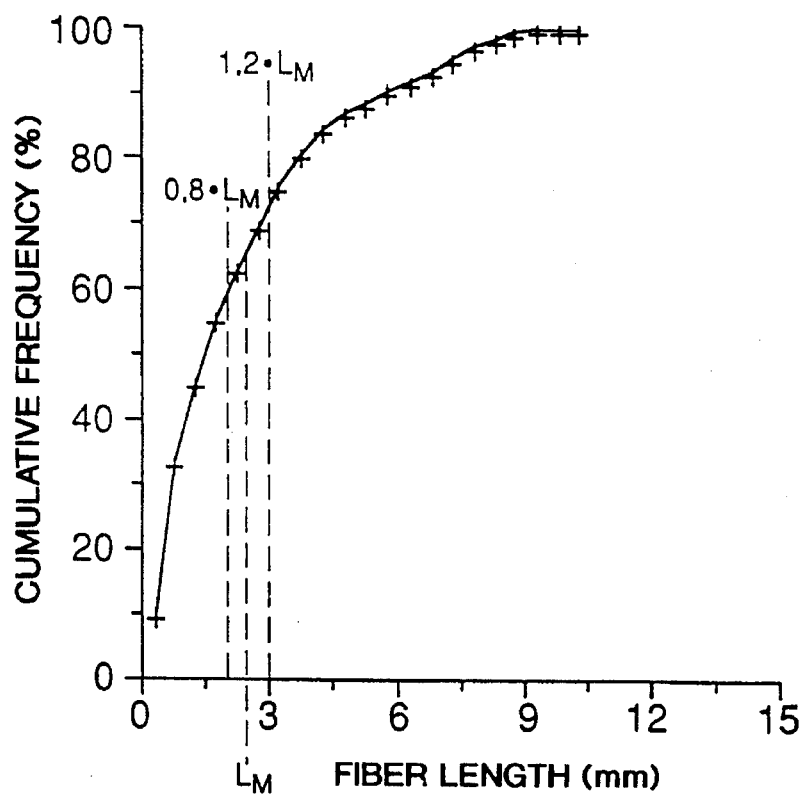
FIG. 5 shows a graph of a cumulative frequency distribution for fiber lengths in another novel material.

In the apparatus shown in FIG. 3, an extruded tape of the plastic material is extruded with the fibers of the fiber length distribution described and is smoothed with the aid of a polishing stack 30. The extrudate smoothed in this way likewise has essentially no fiber ends projecting from the surface. The smoothed material is then pelletized in a strip pelletizer 31.

The invention is now explained with reference to examples which describe the preferred embodiments.

EXAMPLE 1

A corotating twin-screw extruder (ZSK 40 from Werner & Pfleiderer, Stuttgart) was charged with polypropylene pellets, coupling agent and dye additives at a material flow rate of 21 kg/h, and these were mixed at 220° C. with chopped textile glass fibers having a linear density of 300 tex and a length of 13.5 mm introduced downstream, the mixture was extruded through a slot die, segmented in a segmenting unit and then pelletized by comminution to pellets having a length of 20 mm and a diameter of 5 mm in a chopping unit as shown in principle in FIG. 2. The fiber content and fiber length distribution were determined after ashing individual pellets in a muffle furnace. The pellets had a fiber content of 30% by weight. The fibers had a length of up to 10 mm the mean fiber length was 2.46 mm (weight average).

EXAMPLE 2

A corotating twin screw extruder (ZSK 40 from Werner & Pfleiderer, Stuttgart) was charged with polypropylene pellets, coupling agent and dye additives at a material flow rate of 21 kg/h, and these were mixed at 220° C. with glass fiber rovings having a linear density of 2400 tex introduced downstream, the mixture was extruded through a slot die, smoothed in a polishing stack, cooled and then pelletized by comminution in a strip pelletizer as shown in principle in FIG. 3 to give pellets having a length of 20 mm and diameter of 5 mm. The fiber content and fiber length distribution were determined after ashing individual pellets in a muffle furnace. The pellets had a fiber content of 30% by weight. The fibers had a length of up to 16 mm the mean fiber length was 2.15 mm (weight average).

EXAMPLE 3

A corotating twin-screw extruder (ZSK 40 from Werner & Pfleiderer, Stuttgart) was charged with polypropylene granules, coupling agent and dye additives at a material flow rate of 21 kg/h, and these were mixed at 220° C. with chopped glass fibers having a linear density of 300 tex and a length of 4.5 mm introduced downstream, extruded through two round-section dies as shown in FIGS. 1a-d, and pelletized in a pelletizer as shown in FIG. 1. The pellets had a length of 5 mm and a mean diameter of 4 mm. The fiber content and fiber length distribution were determined after ashing individual pellets in a muffle furnace. The pellets had a fiber content of 30% by weight. The fibers had a length of up to 4.5 mm; the mean fiber length was 2.05 mm (weight average).

We claim:

1. A fiber composite plastic comprising a plastic composition and fibers, wherein the fibers have a pronounced fiber length distribution, such that more than 50% by weight of the fibers have a length outside the range from 0.8×L to 1.2×L, where L is the mean (weight average) fiber length, and the mean fiber length is greater than the critical fiber length of the plastic composition/fiber system.

2. A fiber composite plastic of claim 1, comprising from 65 to 92 parts by volume of plastic composition and from 35 to 8 parts by volume of fibers, comprising from 75 to 87 parts by volume of plastic composition and from 25 to 13 parts by volume of fibers.

3. A fiber composite plastic of claim 1, wherein the plastic composition is a thermoplastic composition.

4. A fiber composite plastic of claim 1, wherein the plastic composition comprises one or more of the following plastics:

polyolefins
styrene polymers
polyamides polyether ketones polysulfones.

5. A fiber composite plastic of claim 1, wherein the fibers are one or more of the fibers of the group consisting of:

glass fibers carbon fibers natural fibers, in particular
   sisal fibers and
   flax fibers.

6. A fiber composite plastic of claim 1, wherein the fibers have a mean fiber length L of greater than 1 mm and preferably less than 25 mm.

7. A fiber composite plastic claim 1, wherein the fibers have a filament diameter of from 7 to 300 μm.

8. A fiber composite plastic claim 1, which comprises pellets.

9. A process for the preparation of a fiber composite plastic comprising plastic composition and fibers which comprises subjecting a first plastic material comprising at least one first composition of fibers having an essentially uniform fiber length and a plastic composition to mechanical loading such that a second plastic material is formed which comprises the plastic composition and a second composition of fibers, where this second composition of fibers has a pronounced fiber length distribution, wherein more than 50% by weight of the fibers have a fiber length outside the range of from 0.8×L to 1.2×L, where L is the mean (weight average) fiber length, and the mean fiber length is greater than the critical fiber length of the plastic composition/fiber system.

10. A process of claim 9, wherein the second plastic material is converted into pellets by one of the three following methods:

a. The second plastic material is shaped in the plastically deformable state in the melt-softened state, by shaping tools, in particular extruders and/or calenders, to give a sheet- or strip-shaped material having a surface essentially free from protruding fibers, and is subsequently pelletized;

b. The second plastic material is pressed in the plastically deformable state to give particles by a profiled calender or a pelleting press;

c. The second plastic material is extruded through one or more manifolds to give extrudates which run, in elongate, narrow form and essentially smooth, from a manifold inlet side to a manifold outlet side, and the extrudates are pelletized.

11. A process of claim 9, wherein the essentially uniform length of the fibers is at least 2 mm and the fibers employed have a length of from 2 to 50 mm, and originate from continuous fibers.

12. A process of claim 9, wherein the fibers are fed to the extruder in the form of continuous fibers.

13. A process of claim 9, wherein said first plastic material comprises from 65 to 92 parts by volume of plastic composition and
   from 35 to 8 parts by volume of fibers, and/or wherein the plastic composition comprises one or more of the following plastics:

polyolefins styrene polymers polyamides polyether ketones polysulfones, and/or wherein the fibers are one or more of the fibers of the group consisting of:

glass fibers carbon fibers natural fibers.

14. The process of claim 13 wherein the natural fibers are sisal fibers and/or flax fibers.

15. A fiber composite plastic of claim 1, wherein said first plastic material comprises from 65 to 92 parts by volume of plastic composition and
   from 35 to 8 parts by volume of fibers, and/or wherein the plastic composition comprises one or more of the following plastics:

polyolefins styrene polymers polyamides polyether ketones polysulfones, and/or wherein the fibers are one or more of the fibers of the group consisting of:

glass fibers carbon fibers natural fibers and/or wherein the fibers have a mean fiber length L of greater than 1 mm, and preferably less than 25 mm.

16. The fiber composite plastic of claim 4 wherein the plastic is a propylene polymer, the major proportion or all of which is isotactic polypropylene.

17. The fiber composite plastic of claim 7 wherein the fiber is a carbon fiber having a diameter of about 7 μm.

18. The fiber composite plastic of claim 7 wherein the fiber is a natural fiber having a diameter of about 300 μm.

19. The fiber composite plastic of claim 8 wherein the pellets are formed by extrusion and chopping.

20. The fiber composite plastic of claim 8 wherein the pellets have a length of from 5 to 25 mm.

21. A process of claim 9 wherein the mechanical loading is in an extruder.

22. A process of claim 21 wherein the extruder is a screw extruder.

23. A process of claim 10 wherein, method a. is employed and the subsequent pelletization is strip-pelletization.

24. A process of claim 12 wherein the continuous fibers are glass fiber rovings.

25. A process of claim 13 wherein the first plastic material comprises from 75 to 87 parts by volume of plastic composition and from 25 to 12 parts by volume of fibers.

26. The process of claim 13 wherein the polyolefin is a propylene polymer, the major proportion or all of which is isotactic polypropylene.

27. A process for the production of plastic moldings by injection molding or pressing the plastic in the plastically deformable state wherein the plastic is the fiber composite of claim 1.

28. The process of claim 27 wherein the plastic in the plastically deformable state is in the melt softened state.

29. A fiber composite plastic as in claim 15 wherein the first plastic material comprises from 75 to 87 parts by volume of plastic composition and from 25 to 13 parts by volume of fibers.

30. A fiber composite plastic as in claim 15 wherein the polyolefin is a propylene polymer, the major proportion or all of which is isotactic polypropylene.

31. A fiber composite plastic as in claim 15 wherein the natural fibers are sisal fibers and/or flax fibers.

32. A fiber composite plastic as in claim 15 wherein mean fiber length is less than 25 mm.

* * * * *

UNITED STATES PATENT AND TRADEMARK OFFICE
CERTIFICATE OF CORRECTION

PATENT NO.: 5,595,696

DATED: January 21, 1997

INVENTOR(S): SCHLARB et al.

It is certified that error appears in the above-identified patent and that said Letters Patent is hereby corrected as shown below:

Column 7, claim 7, line 14, after "plastic" insert --of--.

Column 7, claim 8, line 16, after "plastic" insert --of--.

Column 8, claim 15, line 25, delete ", and preferably less than 25 mm".

Signed and Sealed this

Eighth Day of April, 1997

Attest:

BRUCE LEHMAN

Attesting Officer

Commissioner of Patents and Trademarks